Figure 1:
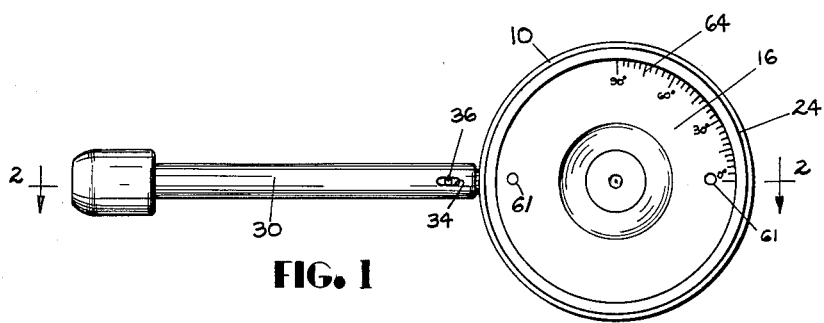

May 24, 1966   G. F. REMPFER   3,253,144
ELECTRON LENS HAVING MEANS FOR CORRECTING ASTIGMATISM
Filed May 27, 1963   2 Sheets-Sheet 1

GERTRUDE F. REMPFER
INVENTOR.
BY
BUCKHORN, BLORE, KLARQUIST & SPARKMAN
ATTORNEYS

May 24, 1966  G. F. REMPFER  3,253,144
ELECTRON LENS HAVING MEANS FOR CORRECTING ASTIGMATISM
Filed May 27, 1963  2 Sheets-Sheet 2

GERTRUDE F. REMPFER
INVENTOR.
BY
BUCKHORN, BLORE, KLARQUIST & SPARKMAN
ATTORNEYS

United States Patent Office 3,253,144
Patented May 24, 1966

3,253,144
ELECTRON LENS HAVING MEANS FOR CORRECTING ASTIGMATISM
Gertrude F. Rempfer, Forest Grove, Oreg., assignor to Tektronix, Inc., Beaverton, Oreg., a corporation of Oregon
Filed May 27, 1963, Ser. No. 283,424
6 Claims. (Cl. 250—49.5)

The subject matter of the present invention relates generally to electron lenses of the electrostatic type, and in particular to lenses which are compensated to correct for image aberrations, such as astigmatism, and to methods of reducing such astigmatism.

The electron lens of the present invention is particularly useful when employed as the object lens of an electron microscope or in other electron optics systems. All uncompensated electron lenses suffer from the image aberration defect known as astigmatism due to the fact that they are not perfectly symmetrical about the lens axis so that the electrostatic focusing fields produced by the lens are not symmetrical. As a result of this axial asymmetry, the images produced by the lens are impaired in stigmatic quality due to a variation of the focal distance of the lens for different electron paths at various azimuths about the lens axis. The term "focal distance" is used throughout the present application to mean the distance from the lens center to a point on the lens axis where the image is in focus. Thus, it is apparent that an uncompensated electron lens suffering from the astigmatism referred to above will have a plurality of focal distances, rather than one such focal distance, including a maximum focal distance and a minimum focal distance. The compensated lens of the present invention is corrected for astigmatism by providing two electrodes with pairs of axial asymmetries or discontinuities which are positioned to introduce a correction field having a maximum correction axis that is employed to move either the maximum focal distance or the minimum focal distance into registration with the correct focal distance for the lens. This tends to equalize the focal distance at all azimuths and thus, corrects the lens for astigmatism so that the resolution of such lens is increased by a substantial amount.

The electron lens of the present invention is an improvement over my previous electron lens, disclosed in U.S. Patent 2,536,878 which issued January 2, 1951, to Gertrude M. Fleming and is entitled "Electron Lens." The present electron lens has several advantages over conventional electron lenses including the one described in the above-mentioned patent. The primary advantage of the present lens is the employment of an extremely simple structure to correct such lens for astigmatism which is less expensive to manufacture and easier to adjust than previous compensation devices. Another advantage of the electron lens of the present invention is that it enables a simpler and faster method of adjusting the lens to reduce astigmatism. In addition, the increase in resolution obtained by the compensated lens of the present invention is comparable with that obtained by conventional lenses employing much more complicated and expensive compensation devices and methods of adjustment.

One of the greatest causes of defects in image formation by an electron lens is the axial asymmetry due to the irregular shape of the apertures of the electrodes of such lens through which the electron beam passes. For proper operation of the lens, the electron beam apertures should be perfectly circular in planes perpendicular to the common axis of the lens. However, it is impossible to make apertures of a perfectly circular shape and even very small eccentricities in the apertures produce sufficient asymmetry in the focusing fields to defocus the highly magnified images obtained in electron microscopes. In a three element electron lens, the diameter of the aperture in the central electrode and the thickness of such central electrode greatly affect the focal properties of such lens, while the distance between the two outer electrodes of the lens also controls such focal properties to a lesser extent. The lens of the present invention compensates for astigmatism by effectively varying the distance as a function of azimuth between the outer electrodes. A fine adjustment can be made in this manner which is much simpler than that made by variation of the aperture diameter or thickness of the central electrode.

Briefly, this compensation is accomplished by forming a pair of discontinuities on the inner side surface of each of the entrance and exist electrodes on opposite sides of the beam apertures of such electrodes adjacent the periphery of such apertures. If both of these pairs of discontinuities are projections, the entrance and exit electrodes are positioned in alignment with the astigmatism azimuth of minimum focal distance which may be found by conventional methods indicated in U.S. Patent 2,536,-878 referred to above. If the amount of correction is too great and causes over-correction, it is reduced to the proper amount by rotating the exit and entrance electrodes with respect to each other through an angle less than 90° while maintaining the correction axis in alignment with the astigmatism azimuth.

It is therefore one object of the present invention to provide an improved electron lens of the electrostatic type.

Another object of the invention is to provide an improved electron lens which is corrected for astigmatism.

A further object of the present invention is to provide an improved electron lens of a simple and inexpensive structure which can be quickly and easily adjusted to correct for image aberration caused by axial asymmetry.

An additional object of the invention is to provide an improved method of reducing astigmatism in electron lenses.

Still another object of the invention is to provide an improved electron lens for an electron microscope in which the entrance and exist electrodes employed in such lens are each provided with a pair of discontinuities on their inner side surfaces on opposite sides of the beam apertures through such electrodes to reduce the astigmatism of such lens and to increase the resolution of such microscope.

Figure 2:
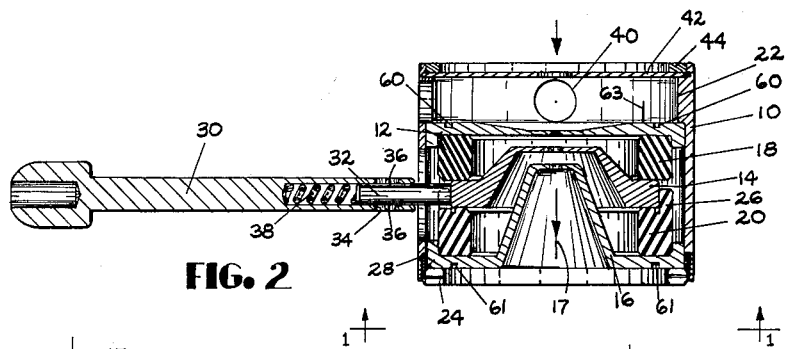
Figures 3, 4:
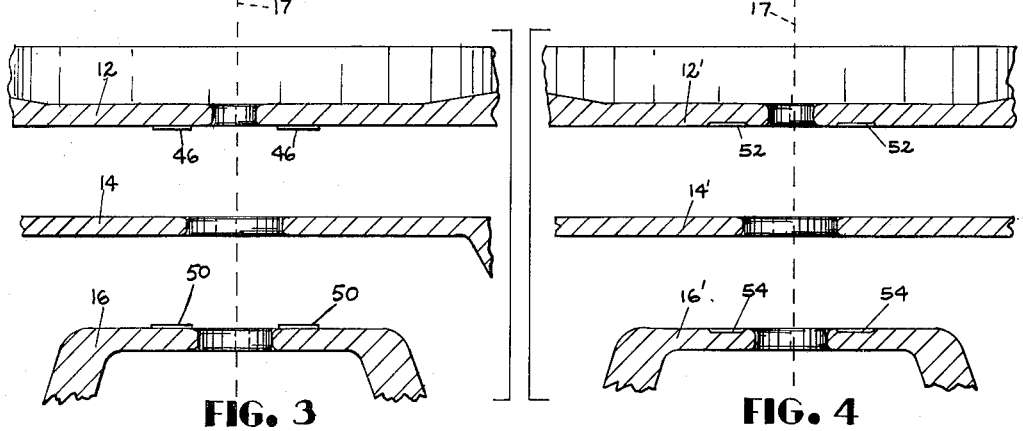
Figure 5A:
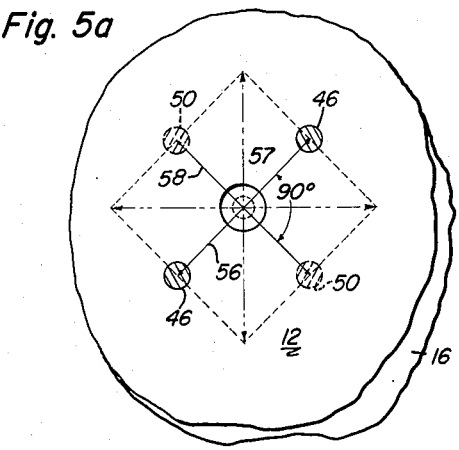
Figure 6A:
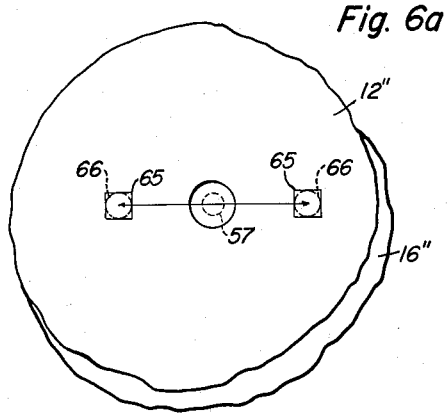
Figure 5B:
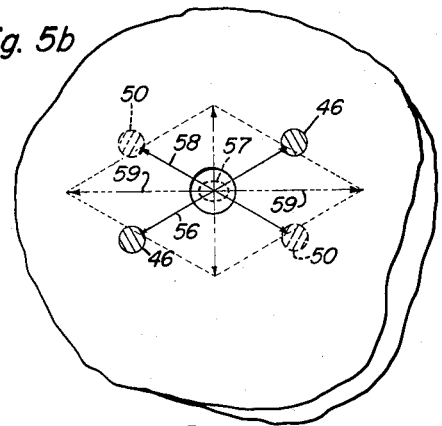
Figure 6B:
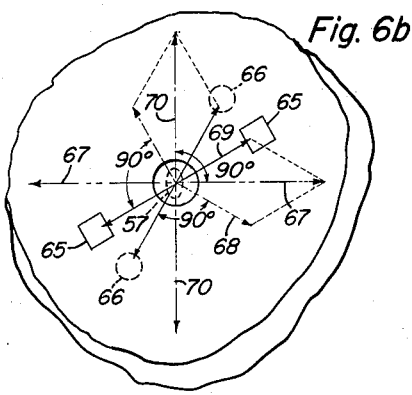
Figure 5C:
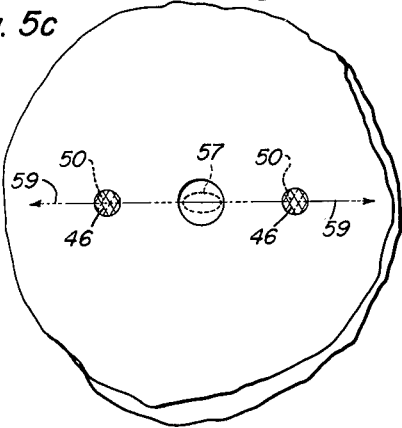
Figure 6C:
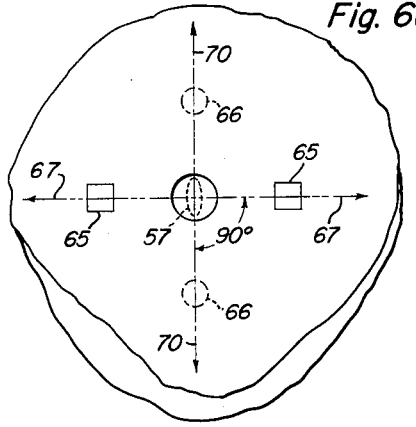

Other objects and advantages of the present invention will be apparent from the following detailed description of certain preferred embodiments thereof and from the attached drawings of which:

FIG. 1 is a plane view of the exit end of an electron lense made in accordance with the present invention, FIG. 2 is a horizontal sectional view taken along the line 2—2 of FIG. 1, FIG. 3 is an enlarged view of a portion of FIG. 2 showing one embodiment of the compensation discontinuities of the present invention, FIG. 4 is an enlarged view of a portion of FIG. 2 showing another embodiment of the compensation discontinuities of the present invention, FIGS. 5A, 5B and 5C show different positions of the discontinuities of FIG. 3 corresponding to the zero, intermediate and maximum amounts of correction, and FIGS. 6A, 6B and 6C show the zero, intermediate and maximum correction positions, respectively, of entrance and exit electrodes employing a third embodiment of the compensation discontinuities of the present invention.

As shown in FIGS. 1 and 2, the electron lens includes a hollow cylindrical lens cell or mount 10 which holds an entrance electrode 12, a central electrode 14, and an exit electrode 16 in a spaced, coaxial relationship. Each of these electrodes is in the form of substantially axially symmetrical diaphragm having a circular center portion of reduced thickness through which a substantially circular beam aperture extends. The three electrodes 12, 14 and 16 are coaxially mounted on a common axis 17 passing through the center of their electron beam apertures so that an electron beam enters the lens through entrance electrode 12 and leaves through exit electrode 16. These electrodes are held in spaced relationship by first and second spacer rings 18 and 20 positioned between the electrodes. The spacer rings 18 and 20 may be made of alumina ceramic material or other suitable electrical insulators so that the first spacer ring electrically insulates the central electrode 14 from the entrance electrode 12, while the second spacer ring insulates the exit electrode 16 from such central electrode. After the electrodes and spacer rings have been properly assembled within the lens mount 10 by inserting them through the rear end of such mount until the front surface of the entrance electrode 12 engages an annular inwardly extending shoulder portion 22 adjacent the front end of such mount, this assembly is clamped in the mount by a retaining ring 24 which is screw threaded into the rear end of the mount to prevent movement of such electrodes. It should be noted that the central electrode 14 is held in axial alignment with the entrance and exit electrodes by means of an annular forwardly extending flange portion 26 on the second spacer ring 20. This spacer ring is held in axial alignment with the exit electrode 16 by means of an annular forwardly extending flange portion 28 on the periphery of such exit electrode.

The central electrode 14 is connected to a source of high negative D.C. voltage by means of a lead rod 30 having a spring biased plunger 32 mounted in one end thereof for resilient engagement with the outer edge of the central electrode through an opening in the side of the lens mount 10 and a notch in the flange portion 26 of spacer ring 20. The high voltage lead rod 30 is provided with a pair of elongated slots 34 through the opposite sides of such rod into a cylindrical cavity formed in one end of such rod. The plunger 32 is provided with a pair of stops 36 which project into the slots 34 to limit axial and rotational movement of the plunger within the lead member. The lead rod is suitably mounted so that the plunger extends substantially perpendicular to the lens mount 10. A coil spring 38 positioned within the cavity at one end of the lead rod urges the plunger into electrical contact with the outer edge of the central electrode. The entrance and exit electrodes are electrically contacted to each other through the metal lens mount 10 which is grounded so that the central electrode is negative with respect to these two outer electrodes and an electrostatic focusing field is produced by said lens.

It should be noted that an opening 40 is provided in the side of the lens mount 10 through the shoulder portion 22 to allow the insertion of a specimen holder into the front end of the lens mount so that such specimen is positioned directly in front of the beam aperture in the entrance electrode 12. In addition, a shield plate 42 of high magnetic permeability metal is provided over the front end of the lens mount with the enlarged aperture of such plate in alignment with the lens axis 17. The shield plate is held in place by a retaining ring 44 similar to retaining ring 24, which is screw threaded into the front end of the lens mount to clamp such shield plate between such ring and the shoulder portion 22. This shield plate helps prevent external electrical or magnetic fields from distorting the focusing field produced inside the lens holder.

In order to compensate the electron lens for astigmatism, the entrance electrode 12 may be provided with a pair of axial asymmetries or discontinuities in the form of projections 46 on the inner surface of such electrode, as shown in FIG. 3. These projections are positioned on opposite sides of the beam aperture of electrode 12 adjacent the periphery of such aperture and located on a common diameter thereof so that they are approximately 180 degrees apart. The projections may be formed by metal deposits which are coated on the entrance electrode by sputtering metal through a mask with openings cut in the shape of the projections. The shape of these deposited projections is not critical and they may be abrupt or gradual discontinuities. However, it has been found that for practical reasons, it is desirable to make the projections identical in height and area so that they have substantially equal compensation effects on the focusing field. This also avoids misalignment of the electron beam. When similar shaped projections are employed they are positioned substantially the same distance from the lens axis 17. A similar pair of projections 50 may be provided on the inner surface of the exit electrode 16 so that they are positioned on the opposite sides of the beam aperture in such electrode on a diameter thereof separated by about 180°. Each of these projections may extend approximately .001 inch above the surface of the electrodes when the diameter of the aperture in the central electrode is on the order of .1 inch and the distances between the central electrode and the outer electrode are about .1 inch.

FIG. 4 shows another embodiment of the present invention similar to FIG. 3 in which the projections 46 and 50 have been replaced by indentations 52 and 54 on electrodes 12' and 16', respectively. The indentations are also axial asymmetries or discontinuities which may be employed to compensate for any astigmatism in the lens. These indentations may also be formed substantially identical with a depth of approximately .001 inch, in any suitable manner such as by chemically etching through a mask, by mechanical abrasion or cutting.

The rotational position of projections 46 and 50 about the common axis 17 determines the amount of correction introduced by such projections, as shown in FIGS. 5A, 5B and 5C. In FIG. 5A, the diameter lines 56 and 58 of projections 46 and 50, respectively, are positioned at right angles to each other. In this position the projections produce no effective correction on a circular cross section 57 electron beam shown enlarged for clarity, because they compensate for each other. However, in FIG. 5B, the diameter lines 56 and 58 are displaced by an angle of 45° and in this intermediate position the projections produce a maximum correction plane whose axis 59 lies approximately midway between the diameter lines of projections 46 and 50. This results in expansion of the beam cross section 57 along axis 59. If the exit and entrance electrodes are positioned so that the diameter lines are in alignment, as shown in FIG. 5C, the projections produce a maximum amount of correction which expands the beam cross section 57 even further in the plane determined by the diameters of the pairs of projections along correction axis 59.

In order to correct for astigmatism in the electron lens of FIGS. 2 and 3, the uncompensated entrance and exit electrodes are positioned within the lens mount on opposite sides of the central electrode 14 and the resulting lens structure is tested in a conventional manner to determine the astigmatism azimuth of minimum focal distance, for example, in the manner recited in U.S. Patent No. 2,536,878. Next, the exit and entrance electrodes are removed from the lens mount and provided with the correcting projections 46 and 50. Then these compensated entrance and exit electrodes 12 and 16 are inserted back into the lens mount and positioned so that they exert the maximum correction of FIG. 5C and are located so that the axis 59 of maximum correction is in alignment with the astigmatism azimuth of minimum focal distance. The lens is again tested for astigmatism. If it is found that the lens has been overcorrected, the retaining ring 24 is loosened slightly and the exit electrode 16 and the entrance electrode 12 are rotated with respect to each other by suitable tools inserted into two pairs of notches 60 and 61. These notches 60 and 61 are provided in the outer side surfaces of electrodes 12 and 16, respectively, out of the focusing field to enable rotation of the diameters of the pairs of projections 46 and 50 into some intermediate position similar to that shown in FIG. 5B. This reduces the amount of correction and may be repeated until such correction exactly compensates for the astigmatism of the lens if the axis of correction is maintained in alignment with the astigmatism azimuth of minimum focal distance during rotation of the electrodes. After this condition has been obtained, the retaining ring 24 is tightened to clamp the electrodes in their correct angular positions. The center electrode 14 is held in a fixed position during rotation by pressing a suitable tool against the periphery of such electrode in place of the lead rod and plunger. It may also be desirable to provide a reference mark 63 on the side of the lens mount 10 and a scale 64 on the outer side surfaces of each of the electrodes 12 and 16 in order to aid in the adjustment of such electrodes and to enable quick assembly of the lens after it has been so adjusted.

The entrance and exit electrodes 12' and 16' of FIG. 4 may be adjusted with respect to the center electrodes 14' in a similar manner to that already described with reference to FIG. 3. However, since the correcting discontinuities employed in these electrodes are indentations rather than projections, the axis of maximum correction must be positioned in alignment with the astigmatism azimuth of maximum focal distance rather than the azimuth of minimum focal distance. Other than this, the method steps are the same and the position of the maximum amount of correction is obtained with the diameter of the indentations 52 and 54 in alignment as shown in FIG. 5C. It should be noted that the correction produced by the indentation is opposite to that produced by the projections so that the beam cross section 57 is compressed in the maximum correction plane 59.

However, it is also possible to employ a combination of different discontinuities including a pair of indentations and a pair of projections. If a pair of indentations 65 is provided on the entrance electrode 12" and a pair of projections 66 is provided on the exit electrode 16" these discontinuities will compensate for each other to produce no correction when they are in alignment as shown in FIG. 6A. Thus, if the height of the projection and the depth of the indentation are equal, then in this position the distance between the two outer electrodes is the same when measured from a projection to an indentation as it is when measured between the other surface portions of the electrodes. However, if the pairs of indentations and projections 65 and 66 are rotated out of alignment into the intermediate position of FIG. 6B, some correction will result due to the change in the focusing field caused by the variation in the distance between the two outer electrodes. An axis of maximum correction 67 may be determined for the astigmatism azimuth of maximum focal distance by adding a vector 68 extending perpendicular to the diameter of the projections 66, to a vector 69 corresponding to the axis of indentations 65. In addition, another axis of maximum correction 70 may be determined for the astigmatism azimuth of minimum focal distance in a similar manner. It should be noted that these two axes 67 and 70 are at right angles to each other. For a maximum amount of correction, the diameters of the indentations 65 and the projections 66 are positioned perpendicular to each other, as shown in FIG. 6C. This produces the pair of maximum correction axes 70 and 67 which intersect each other at right angles in alignment with the diameters of the projections and indentations, respectively. Therefore, either of these correction axes of FIG. 6C may be placed in alignment with the proper astigmatism azimuth and the pairs of discontinuities are then rotated toward each other in order to reduce the amount of correction while maintaining the correction axis in alignment with the astigmatism azimuth in the manner of FIG. 5.

It will be obvious to those having ordinary skill in the art that various changes may be made in the details of the above-described preferred embodiments of the present invention without departing from the spirit of the invention. Therefore, the scope of the present invention should only be determined by the following claims.

I claim:

1. An electrostatic electron lens, comprising:
a plurality of electrically conductive electrodes each having a substantially circular aperture for the passage of electrons through said electrodes;
means for coaxially mounting said electrodes so that a first electrode is positioned between and is in spaced insulated relationship from a second electrode and a third electrode;
a first pair of dimensional discontinuities provided on the inner side surface of said second electrode nearest said first electrode, said first pair of discontinuities being permanently fixed relative to the second electrode and to each other and positioned adjacent the periphery of the aperture of said second electrode on opposite sides of the aperture along a diameter line of said aperture; and
a second pair of dimensional discontinuities provided on the inner side surface of said third electrode nearest said first electrode, said second pair of discontinuities being permanently fixed relative to the third electrode and to each other and positioned adjacent the periphery of the center aperture of said third electrode on opposite sides of the aperture along a diameter line of said aperture.

2. An electrostatic electron lens, comprising:
a plurality of electrically conductive electrodes each having a substantially circular aperture for the passage of electrons through said electrodes;
means for coaxially mounting said electrodes so that a central electrode is positioned between and is in spaced insulated relationship from an entrance electrode and an exit electrode;
a first pair of compensation discontinuities provided on the inner side surface of said entrance electrode nearest said central electrode, said first pair of discontinuities being permanently fixed relative to the entrance electrode and to each other positioned adjacent the periphery of the aperture of said entrance electrode on opposite sides of the aperture along a diameter line thereof;
a second pair of compensation discontinuities provided on the inner side surface of said exit electrode nearest said central electrode, said second pair of discontinuities being permanently fixed relative to the exit electrode and to each other and positioned adjacent the periphery of the aperture of said exit electrode on opposite sides of the aperture along a diameter line thereof; and
means for rotating said entrance electrode and said exit electrode with respect to each other about their common axis in order to change the angular displacement of said first and second pairs of discontinuities so that astigmatism of the lens is reduced.

3. An electrostatic electron lens, comprising:
a plurality of substantially symmetrical, electrically conductive electrodes each having a substantially circular center aperture whose axis corresponds to the axis of symmetry of said electrodes for the passage of electrons through said electrodes;
means for coaxially mounting said electrodes so that a central electrode is positioned between and is in spaced insulated relationship from an entrance electrode and an exit electrode;

a first pair of compensation projections of substantially the same effective size provided on the inner side surface of said entrance electrode nearest said central electrode, said first pair of projections being fixedly positioned adjacent the periphery of the center aperture of said entrance electrode on opposite sides of the aperture along a diameter line thereof at substantially equal distances from the axis of said entrance electrode;

a second pair of compensation projections of substantially the same effective size provided on the inner side surface of said exit electrode nearest said central electrode, said second pair of projections being fixedly positioned adjacent the periphery of the center aperture of said exit electrode on opposite sides of the aperture along a diameter line thereof at substantially equal distances from the axis of said exit electrode; and means for rotating said entrance electrode and said exit electrode with respect to each other about their common axis in order to change the angular displacement of said first and second pairs of projections, and for enabling relative rotation between said central electrode and said exit and entrance electrodes about the axis, so that astigmatism of the lens is reduced.

4. An electrostatic electron lens, comprising:

a plurality of substantially symmetrical, electrically conductive electrodes each having a substantially circular center aperture whose axis corresponds to the axis of symmetry of said electrodes for the passage of electrons through said electrodes;

means for coaxially mounting said electrodes so that a central electrode is positioned between and is in spaced insulated relationship from an entrance electrode and an exit electrode;

a first pair of compensation indentations provided on the inner side surface of said entrance electrode nearest said central electrode, said first pair of indentations being fixedly positioned adjacent the periphery of the center aperture of said entrance electrode on opposite sides of the aperture along a diameter line thereof at substantially equal distances from the axis of said entrance electrode;

a second pair of compensation indentations provided on the inner side surface of said exit electrode nearest said central electrode, said second pair of indentations being fixedly positioned adjacent the periphery of the center aperture of said exit electrode on opposite sides of the aperture along a diameter line thereof at substantially equal distances from the axis of said exit electrode; and means for rotating said entrance electrode and said exit electrode with respect to each other about their common axis in order to change the angular displacement of said first and second pairs of indentations, and for enabling relative rotation between said central electron and said exit and entrance electrodes about the axis, so that astigmatism of the lens is reduced.

5. An electrostatic lens comprising:

at least three electrodes each having an aperture for the transmission of an electron beam through said electrodes;

means for mounting said three electrodes in spaced insulated relationship with their apertures in axial alignment to provide first and second outer electrodes and an intermediate electrode between said outer electrodes;

a plurality of first discontinuities provided on the inner surface of said first outer electrode between said first outer electrode and said intermediate electrode, said first discontinuities being fixed relation to said first outer electrode and to each other and spaced about the periphery of the aperture of said first outer electrode; and a plurality of second discontinuities equal in number to said first discontinuities provided on the inner surface of said second outer electrode between said second outer electrode and said intermediate electrode, said second discontinuities being fixed relative to said second outer electrode and to each other and spaced about the periphery of the aperture of said second outer electrode.

6. An electrostatic lens comprising:

at least three electrodes each having an aperture for the transmission of an electron beam through said electrodes;

means for mounting said three electrodes in spaced insulated relationship with their apertures in axial alignment to provide first and second outer electrodes and an intermediate electrode between said outer electrodes;

a plurality of first dimensional discontinuities provided on the inner surface of said first outer electrode between said first outer electrode and said intermediate electrode, said first discontinuities being fixed relative to said first outer electrode and to each other and uniformly spaced about the periphery of the aperture of said first outer electrode;

a plurality of second dimensional discontinuities equal in number to said first discontinuities provided on the inner surface of said second outer electrode between said second outer electrode and said intermediate electrode, said second discontinuities being fixed relative to said second outer electrode and to each other and uniformly spaced about the periphery of the aperture of said second outer electrode; and means for rotating said outer electrodes with respect to each other about the common axis of their apertures to change the angular displacement of said first discontinuities and said second discontinuities.

References Cited by the Examiner

UNITED STATES PATENTS

| 2,536,878 | 1/1951 | Fleming | 250—49.5 X |
| 2,754,443 | 7/1956 | Asmus | 250—49.5 X |
| 2,910,603 | 10/1959 | Van Dorsten et al. | 250—49.5 X |

RALPH G. NILSON, *Primary Examiner.*

HENRY S. MILLER, ANTHONY L. BIRCH,
*Assistant Examiners.*